US009667865B2

(12) United States Patent
Baer et al.

(10) Patent No.: US 9,667,865 B2
(45) Date of Patent: May 30, 2017

(54) OPTICAL DEMODULATION USING AN IMAGE SENSOR

(71) Applicant: Apple Inc., Cupertino, CA (US)

(72) Inventors: Richard L. Baer, Los Altos, CA (US); Michael R. Malone, San Jose, CA (US); Ting Chen, Sunnyvale, CA (US); David Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 14/069,199

(22) Filed: Oct. 31, 2013

(65) Prior Publication Data

US 2014/0125852 A1 May 8, 2014

Related U.S. Application Data

(60) Provisional application No. 61/722,144, filed on Nov. 3, 2012.

(51) Int. Cl.
*H04N 5/335* (2011.01)
*H04N 5/232* (2006.01)
(Continued)

(52) U.S. Cl.
CPC ....... *H04N 5/23245* (2013.01); *H04N 5/2352* (2013.01); *H04N 5/2353* (2013.01); *H04N 5/243* (2013.01); *H04N 5/3532* (2013.01)

(58) Field of Classification Search
CPC .. H04N 5/23245; H04N 5/2353; H04N 5/243; H04N 5/2352; H04N 5/3532;
(Continued)

(56) References Cited

U.S. PATENT DOCUMENTS

| | | | | |
|---|---|---|---|---|
| 5,134,474 | A * | 7/1992 | Hanafusa et al. | ............ 348/247 |
| 6,809,766 | B1 | 10/2004 | Krymski et al. | |

(Continued)

FOREIGN PATENT DOCUMENTS

| | | | |
|---|---|---|---|
| EP | 2427017 | A1 | 3/2012 |
| WO | WO2013074065 | A1 | 5/2013 |

OTHER PUBLICATIONS

PCT International Search Report and Written Opinion of the International Searching Authority for PCT/US2013/068114, mailed Jan. 23, 2014.

(Continued)

*Primary Examiner* — Sinh Tran
*Assistant Examiner* — Zhenzhen Wu
(74) *Attorney, Agent, or Firm* — Blakely, Sokoloff, Taylor & Zafman LLP

(57) ABSTRACT

A controller for an image sensor includes a mode selector that receives a selection between image capture mode and data capture mode. An exposure sensor collects exposure data for a scene falling on the image sensor. A command interface sends commands to the image sensor to cause the image sensor to capture an image with a rolling reset shutter operation in which an integration interval for the image sensor is set based on the exposure data if the image capture mode is selected. The integration interval for the image sensor is set to less than two row periods, preferably close to one row period, without regard to the exposure data if the data capture mode is selected. An analog gain may be increased to as large a value as possible in data capture mode. All pixels in a row may be summed before AD conversion in data capture mode.

25 Claims, 1 Drawing Sheet

(51) Int. Cl.
*H04N 5/353* (2011.01)
*H04N 5/235* (2006.01)
*H04N 5/243* (2006.01)

(58) Field of Classification Search
CPC .... H04N 5/3535; H04N 5/351; H04N 5/2351; H04N 5/353; H04N 3/1556
USPC ................ 348/296, 297, 226.1, 227.1, 228.1
See application file for complete search history.

(56) References Cited

U.S. PATENT DOCUMENTS 6,950,131 B1 9/2005 Kleinhans et al.
7,538,799 B2 5/2009 Yanof
7,619,670 B2 11/2009 Shah
8,026,967 B2 9/2011 Shah
8,150,255 B2 4/2012 Tsai
8,248,467 B1 8/2012 Ganick et al.
2005/0057674 A1* 3/2005 Krymski et al. ............. 348/296
2009/0028453 A1* 1/2009 Collomosse et al. ......... 382/243
2010/0045819 A1* 2/2010 Pillman ................ H04N 5/2357 348/226.1
2010/0165160 A1* 7/2010 Olmstead et al. ............ 348/296
2010/0253833 A1* 10/2010 Deever et al. ................ 348/362
2010/0309340 A1 12/2010 Border et al.
2012/0044846 A1 2/2012 Videv et al.
2012/0092559 A1 4/2012 Ubillos
2012/0134433 A1 5/2012 Haas et al.
2012/0162466 A1* 6/2012 Katagawa ........... H04N 5/2351 348/226.1
2012/0194698 A1 8/2012 Cami
2012/0250637 A1 10/2012 Haas et al.
2013/0187027 A1* 7/2013 Qiao et al. ................ 250/208.1

OTHER PUBLICATIONS

PCT International Preliminary Report on Patentability issued on May 5, 2015 for International Application No. PCT/US2013/068114 filed Nov. 1, 2013.

* cited by examiner

OPTICAL DEMODULATION USING AN IMAGE SENSOR

CROSS REFERENCE TO RELATED APPLICATIONS

This application claims the benefit pursuant to 35 U.S.C. 119(e) of U.S. Provisional Application No. 61/722,144, filed Nov. 3, 2013, which application is specifically incorporated herein, in its entirety, by reference.

BACKGROUND

Field

Embodiments of the invention relate to the field of data capture; and more specifically, to the capture of data transmitted with light.

Background

The cost of energy is driving a transition to more efficient light emitting diode(LED)-based lighting. These emitters are easily modulated at high data rates, potentially providing a broadcast channel to mobile devices for indoor location.

Cameras in mobile devices can detect light, but they are not well suited to capturing data having a high data rate. The frame rates at which typical cameras operate (15 to 60 frames per second) are too low for meaningful communications. It has been demonstrated that a mobile phone can receive information at up to 3.1 kbps by pointing the phone's camera at a bright uniformly illuminated target.

It would be desirable to provide a camera in a mobile device that can receive information transmitted by a light that illuminates a uniform target or an ambient scene with a high data rate modulation.

SUMMARY

A controller for an image sensor includes a mode selector that receives a selection between image capture mode and data capture mode. An exposure sensor collects exposure data for a scene falling on the image sensor. A command interface sends commands to the image sensor to cause the image sensor to capture an image with a rolling reset shutter operation in which an integration interval for the image sensor is set based on the exposure data if the image capture mode is selected. The integration interval for the image sensor is set to less than two row periods, preferably close to one row period, without regard to the exposure data if the data capture mode is selected.

An analog gain may be increased to as large a value as possible in data capture mode. All pixels in a row may be summed before analog to digital conversion in data capture mode. An image sensor frame period may be set according to a signaling frame period of an illumination modulation data transmission in data capture mode.

The controller may further causes data to be inverted from frame to frame and decoding of the difference of two successive frames if the data capture mode is selected. The controller may further causes defocusing of an optical system that forms an image on the image sensor if the data capture mode is selected.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

A light source, such as an LED-based source, can transmit information by modulating the intensity of the source to encode the information. A receiver can receive the information by capturing the changing intensity as a function of time and demodulating the captured temporal signal. The data rate that can be received is limited by the temporal resolution of the captured signal. According to the Nyquist criteria, at least two samples per modulation cycle are required to reconstruct a signal's waveform. A sampling rate somewhat larger than the theoretical requirement, perhaps 4 to 6 samples per modulation cycle are preferred to simplify detection.

Some image sensors used in digital cameras, such as CMOS image sensors, process entire rows of pixels at the same time. Such image sensors can be operated in a "rolling reset shutter" mode. The integration interval for a row of photodiodes begins when a reset signal is sent to the row to clear existing charges in the photodiodes. The integration interval for a row of photodiodes ends when a read signal is sent to the row to transfer accumulated charges in the photodiodes to sensing circuits.

When capturing an image with a rolling reset shutter, a controller collects exposure data for a scene falling on the image sensor. The exposure data is used to set the integration interval to a length of time that will avoid saturating the photodiodes in the brightest areas of the captured image and provide some detail in the darker areas. The integration interval can extend from a minimum of almost zero to a maximum of a frame period (typically 1/15 seconds).

The conventional operation of a rolling reset shutter limits a modulation frequency that can be detected in the scene illumination. Any change in illumination intensity during an integration interval will be averaged for that interval. Since the integration interval can be as long as the frame period, the frame rate sets the upper bound for the modulation frequency.

Figure 1:
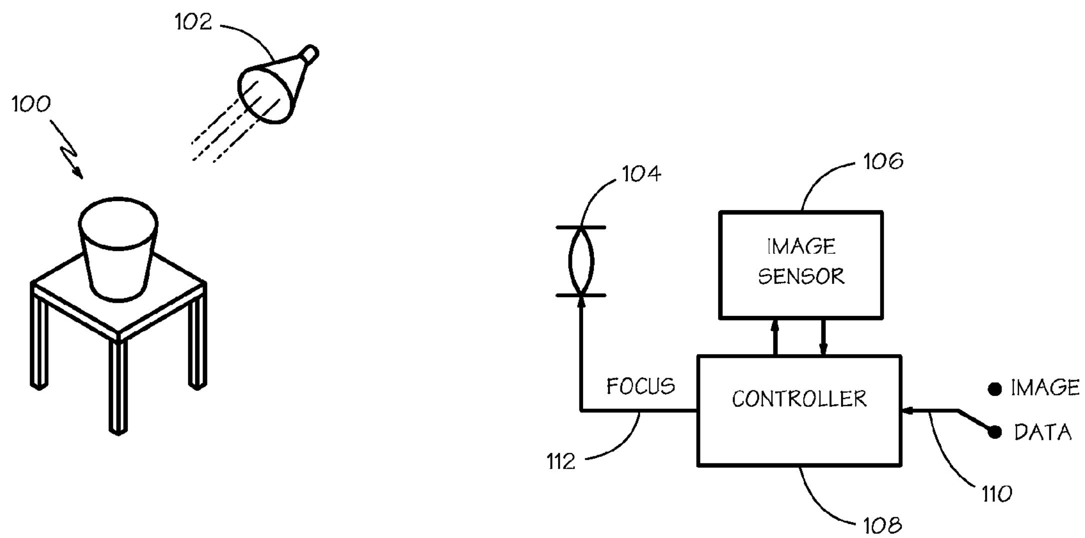
FIG. 1 is a block diagram of an imaging system that embodies the invention.

FIG. 1 is a block diagram of an imaging system that embodies the invention. A light source 102 illuminates a scene 100 with an intensity that varies rapidly over time to encode data. The intensity variations are preferably sufficiently rapid, perhaps at a rate of 100 on/off cycles per second or more, that a human observer cannot perceive the intensity variations. An optical system 104 of a camera, such as a digital camera in a mobile device such as a cellular telephone, forms an image of the scene 100 on a digital image sensor 106. The image is arranged such that the portion of the scene 100 in which the illumination varies due to the data modulation substantially fills the image sensor 106.

A controller 108 is coupled to the image sensor 106. The controller 108 receives a signal from a mode selector 110 that receives a selection between an image capture mode and a data capture mode.

In the image capture mode, the controller 108 uses exposure data for the scene 100 falling on the image sensor 106 collected from an exposure sensor, which may be a separate sensor or all or part of the image sensor, to control a rolling reset shutter operation of the image sensor. The controller 108 adjusts the integration time of the rows of photosensitive elements in the image sensor 106, to obtain a well exposed image of the scene 100 being photographed.

Figure 2:
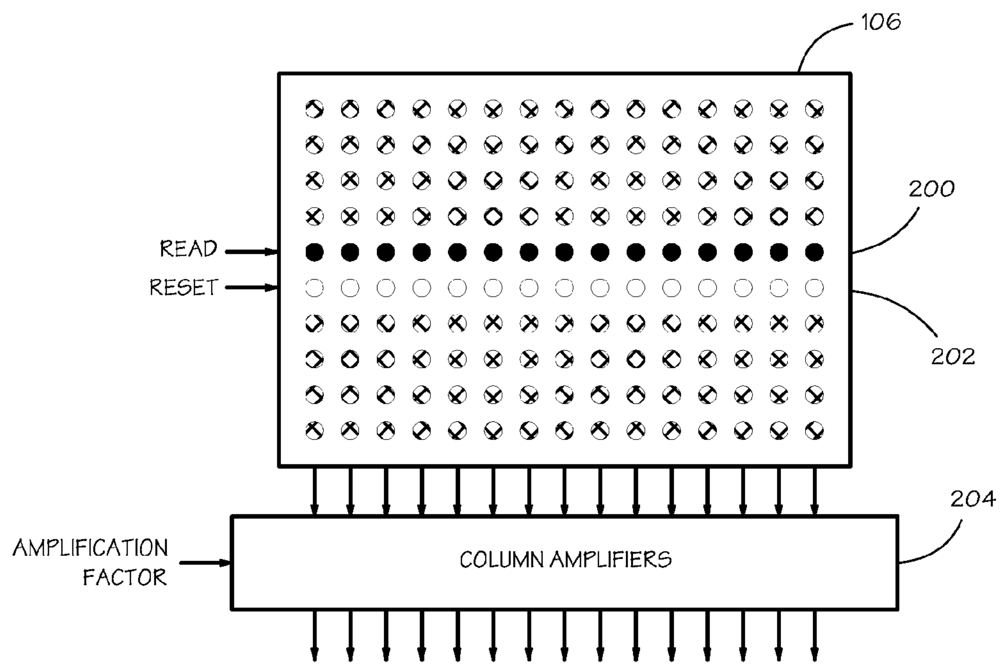
FIG. 2 is block diagram of the image sensor from the imaging system shown in FIG. 1.

FIG. 2 is block diagram of the image sensor 106 from the imaging system shown in FIG. 1. A RESET signal clears a row of photosensitive elements in the image sensor 106 to begin the integration interval. A READ signal transfers the accumulated charge in a row of photosensitive elements to column amplifiers 204 and ends the integration interval. The integration interval is the time between the RESET signal and the following READ signal for a given row. The controller 108 may control the timing of the RESET and READ signals directly, for example by sending a pulse to a shift register that advances these signals through the rows, or indirectly by providing a timing value to an image sensor 106 that includes the necessary logic to generate the RESET and READ signals according to the timing value.

The optimum integration interval for optical demodulation of a modulated light signal is approximately one row period. Under these conditions none of the integration intervals overlap and all of the row samples are temporally distinct. The integration interval is also short enough to enable the beacon signal to be modulated at a high rate (up to the row frequency) without being attenuated in the receiver by being integrated over many cycles. If the integration interval is reduced below one row period, the sensitivity will decrease without providing any compensatory increase in signaling bandwidth. According to the Nyquist criteria, at least two samples per modulation cycle are required to reconstruct a signal's waveform. In the preferred embodiment the sampling rate would be somewhat larger than the theoretical requirement, perhaps 4 to 6 samples per modulation cycle, to simplify detection of the modulated signal.

In the data capture mode, the controller 108 sets the integration interval for the image sensor 106 to less than two row periods without regard to the exposure data. Preferably the integration interval is set close to one row period. Setting the integration interval to less than one row period causes a loss of sensitivity to the illumination levels. Setting the integration interval to more than one row period causes a loss of sensitivity to the modulation frequency as the row signals overlap. Setting the integration interval to other than exactly one row period would be done because of limitations in the implementation of the data capture mode.

It will be appreciated that setting the integration interval for the image sensor 106 to less than two row periods will almost always result in significant underexposure of the photosensitive elements. In order to improve the sensitivity, the analog gain of the column amplifiers 204 may be increased to the largest value that doesn't cause any pixels to be clipped (saturated). Otherwise subsequent analog to digital conversion (ADC) quantization may reduce the sensitivity because of the low signal levels.

In order to further increase sensitivity, all of the pixels in a row may be summed together. Demodulation can be performed on the single column sum that is formed by summing all of the column charge values into a single value. The summing operation can be performed in the statistics block of the image signal processor (ISP) to save power. The summing operation can also be performed on the image sensor 106 itself to save even more power. In any case, the signal should not be subjected to any other image or video processing steps when in the data capture mode as these may reduce sensitivity and bandwidth.

The image sensor 106 may be operated in a lower resolution mode by pixel binning or subsampling to save power and increase sensitivity to the illumination levels. However this may reduce the maximum data rate that can be captured by providing fewer row samples per frame.

Image sensors are commonly operated at 15 frames per second. If the sensor has approximately 2500 rows, then the row period is approximately 26.6 μs. If the optical modulation frequency is about 10 kHz, about 625 bits could be communicated per frame.

The image sensor 106 will not detect modulation that falls in the vertical blanking period that occurs between reading the last active row and the first active row of photosensitive elements on the image sensor 106. During the vertical blanking period there may be several row periods during which no illumination levels can be detected. Therefore techniques like repeated transmissions and error correcting codes should be used to ensure complete data transfer. In the case of a beacon, both methods could be used.

The ultimate low-power solution would be to perform all demodulation functions in the images sensor and to output the data stream over a low-bandwidth interface like a Serial Peripheral Interface Bus (SPI) or Inter-Integrated Circuit Bus (I2C). In this case the sensor wouldn't output any image data, and the high-speed Mobile Industry Processor Interface (MIPI) output ports would be deactivated.

Synchronization can be used to simplify demodulation and to increase the data rate. In one implementation data transmissions would be divided into packets. Each packet would begin with a synchronization sequence, or clock recovery code. Examples of such codes include pseudo-random Noise (PN) sequences. The synchronization packet could also identify the light source 102 as a communications beacon. If the modulation data symbols extend for at least three row periods, the row-level synchronization isn't required.

The controller 108 would then adjust the image sensor timing to cause the beginning of the synchronization sequence to align with the top of the image frame. The rest of the frame would then be available for the payload (e.g. location coordinates). The payload and cyclic redundancy check (CRC) would have to be short enough to keep that data out of the sensor's vertical blanking interval. The CRC location should be separated from the data it protects in case a large block is corrupted by scene content, or by the blanking interval.

The signaling frame period could also be chosen specifically to avoid synchronization with the image sensor (flicker-free) frame period. That way the data packet position would continue slew from frame to frame and after enough frames every data bit would be read. Alternatively the frames could be composed of many small packets, with the packet order randomized from frame to frame. The image sensor frame period could also be set by the controller 108 according to the signaling frame period.

The system could also be configured to transmit a low frequency synchronization code followed by high frequency data (once the receiver/imager is synchronized).

Natural scene content will cause a row to row variation in signal intensity that could mask the beacon signal. A number of techniques can be used to mitigate this. These include:

Inverting data from frame to frame, then decoding the difference of two successive frames;

Using an alternating data patterns with no direct current (DC) content [01, 10] (assuming the spatial resolution of the camera is intrinsically low);

Reading each line twice, alternating the data pattern between reads, which requires a sensor modification;

Using an interlaced readout mode and subtracting fields, with the data pattern alternating between fields;

Defocusing the optical system 104 of the camera to optically average the illumination across the scene 100.

Image sensor issues like row banding, which varies temporally, could still interfere with detection.

Performance could be improved by several innovations at the systems level. These include:

Serialize the LED bulbs for navigation. Each bulb would transmit a unique ID code instead of transmitting a precise coordinate. The association between ID and location would be stored on the network or discovered from other clues.

Keep the image sensor 106 in a (low-power) standby mode. Periodically wake it up to look for a data beacon synchronization code. If it doesn't find one, it goes back to sleep. If it does find one, it decodes the packet, then goes to sleep.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A controller for an image sensor, the controller comprising:

a mode selector that receives a selection between an image capture mode in which an image of a scene is photographed and a data capture mode in which changing light intensity is received and demodulated to capture an encoded signal;

an exposure sensor that collects exposure data for the scene falling on the image sensor; and a command interface coupled to the image senor, the command interface sending commands to the image sensor to cause the image sensor to capture the image of the scene with an image capture rolling reset shutter operation in which an integration interval for the image sensor is set based on the exposure data when the image capture mode is selected, and to cause the image sensor to capture the encoded signal in the changing light intensity with a data capture rolling reset shutter operation in which the integration interval for the image sensor is set to less than two row periods without regard to the exposure data when the data capture mode is selected.

2. The controller of claim 1 in which the integration interval for the image sensor is set as close as possible to one row period if the data capture mode is selected.

3. The controller of claim 1 wherein the controller further increases an analog gain to as large a value as possible that does not cause a pixel value to be clipped if the data capture mode is selected.

4. The controller of claim 1 wherein the image sensor has a pixel array arranged in a first plurality of rows and a second plurality of columns, and wherein the controller further causes all pixels in a each one of the first plurality of rows to be summed before conversion to a digital value for each one of the first plurality of rows if the data capture mode is selected.

5. The controller of claim 1 wherein the controller further sets an image sensor frame period according to a signaling frame period of an illumination modulation data transmission if the data capture mode is selected.

6. The controller of claim 1 wherein the controller further causes data to be inverted from frame to frame and a difference of two successive frames to be decoded if the data capture mode is selected.

7. The controller of claim 1 wherein the controller further causes defocusing of an optical system that forms the image on the image sensor if the data capture mode is selected.

8. A method of controlling a rolling reset shutter on an image sensor having a pixel array arranged in a first plurality of rows and a second plurality columns, the method comprising:

causing the image sensor to capture an image of a scene with an image capture rolling reset shutter operation in which an integration interval for the image sensor is based on exposure data when an image capture mode is selected; and causing the image sensor to capture an image in which changing light intensity is received and demodulated to capture an encoded signal with a data capture rolling reset shutter operation in which the integration interval for the image sensor being less than two row periods without regard to the exposure data when a data capture mode is selected.

9. The method of claim 8 in which the integration interval for the image sensor is set as close as possible to one row period if the data capture mode is selected.

10. The method of claim 8 further comprising increasing an analog gain to as large a value as possible that does not cause a pixel value to be clipped if the data capture mode is selected.

11. The method of claim 8 further comprising forming a sum of all pixels in each one of the first plurality of rows and then converting the sum to a digital value for each one of the first plurality of rows if the data capture mode is selected.

12. The method of claim 8 further comprising setting an image sensor frame period according to a signaling frame period of an illumination modulation data transmission if the data capture mode is selected.

13. The method of claim 8 further comprising inverting data from frame to frame and decoding a difference of two successive frames if the data capture mode is selected.

14. The method of claim 8 further comprising defocusing an optical system that forms the image on the image sensor if the data capture mode is selected.

15. An imaging system comprising:

an image sensor having a pixel array arranged in a first plurality of rows and a second plurality of columns;

a mode selector that receives a selection between an image capture mode in which an image of a scene is photographed and a data capture mode in which changing light intensity is received and demodulated to capture an encoded signal;

an exposure sensor that collects exposure data for the scene falling on the image sensor; and a processor coupled to the image sensor, the mode selector, and the exposure sensor, the processor containing a sequence of instructions that the processor executes to implement a rolling reset shutter by causing the image sensor to capture the image of the scene with an image capture rolling reset shutter operation in which an integration interval for the image sensor based on the exposure data if the image capture mode is selected; and causing the image sensor to capture the encoded signal in the changing light intensity with a data capture rolling reset shutter operation in which the integration interval for the image sensor is set to less than two row periods without regard to the exposure data, if the data capture mode is selected.

16. The imaging system of claim 15 in which the processor further sets the integration interval for the image sensor as close as possible to one row period if the data capture mode is selected.

17. The imaging system of claim 15 in which the processor further increases an analog gain to as large a value as possible without causing a pixel value to be clipped if the data capture mode is selected.

18. The imaging system of claim 15 in which the processor further sums all pixels in each one of the first plurality of rows and then converts the sum to a digital value for each one of the first plurality of rows if the data capture mode is selected.

19. The imaging system of claim 15 in which the processor further sets an image sensor frame period according to a signaling frame period of an illumination modulation data transmission if the data capture mode is selected.

20. The imaging system of claim 15 in which the processor further inverts data from frame to frame and then decodes a difference of two successive frames if the data capture mode is selected.

21. The imaging system of claim 15 further comprising in which the processor is further coupled to an optical system that forms the image on the image sensor and the processor further causes the optical system to defocus the image if the data capture mode is selected.

22. An imaging system comprising:

an image sensor having a pixel array arranged in a first plurality of rows and a second plurality of columns;

a mode selector that receives a selection between an image capture mode in which an image of a scene is photographed and a data capture mode in which information encoded by modulating the intensity of a light source is received;

an exposure sensor that collects exposure data for the scene falling on the image sensor; and a processor coupled to the image sensor, the mode selector, and the exposure sensor, the processor containing a sequence of instructions that the processor executes to implement a rolling reset shutter, wherein if the image capture mode is selected, the processor causes the image sensor to capture the image of the scene with an image capture rolling reset shutter operation in which an integration interval for the image sensor based on the exposure data; and if the data capture mode is selected, the processor causes the image sensor to capture the information encoded by modulating the intensity of the light source with a data capture rolling reset shutter operation in which the integration interval for the image sensor is set to less than two row periods without regard to the exposure data, increases an analog gain to as large a value as possible without causing a pixel value to be clipped, forms a sum of all pixels in each one of the first plurality of rows, and converts the sum from each one of the first plurality of rows to a digital value for each one of the first plurality of rows that represents information encoded by modulating the intensity of the light source.

23. The controller of claim 1 wherein the exposure sensor is a part of the image sensor.

24. The method of claim 8 wherein the exposure data is provided by the image sensor.

25. The imaging system of claim 15 wherein the exposure sensor is a part of the image sensor.

* * * * *